United States Patent
Oshana

(10) Patent No.: US 8,252,178 B2
(45) Date of Patent: Aug. 28, 2012

(54) MAGNETIC TREATMENT OF FLUIDS

(76) Inventor: James Oshana, Horsley Park (AU)

( * ) Notice: Subject to any disclaimer, the term of this patent is extended or adjusted under 35 U.S.C. 154(b) by 270 days.

(21) Appl. No.: 12/352,145

(22) Filed: Jan. 12, 2009

(65) Prior Publication Data

US 2010/0176045 A1 Jul. 15, 2010

(51) Int. Cl.
*B01D 35/06* (2006.01)
(52) U.S. Cl. .................. 210/222; 210/695
(58) Field of Classification Search .......... 210/222, 210/223, 695
See application file for complete search history.

(56) References Cited

U.S. PATENT DOCUMENTS

| | | | | |
|---|---|---|---|---|
| 4,320,003 | A * | 3/1982 | Sanderson et al. | 210/222 |
| 4,455,229 | A * | 6/1984 | Sanderson et al. | 210/222 |
| 4,505,815 | A * | 3/1985 | Lindler | 210/223 |
| 4,611,615 | A * | 9/1986 | Petrovic | 137/13 |
| 5,161,512 | A * | 11/1992 | Adam et al. | 123/538 |
| 5,453,188 | A * | 9/1995 | Florescu et al. | 210/222 |
| 6,743,365 | B1 * | 6/2004 | Marlowe | 210/695 |
| 2008/0149548 | A1 * | 6/2008 | White | 210/222 |

FOREIGN PATENT DOCUMENTS

JP 2008264600 A * 11/2008

OTHER PUBLICATIONS

English language machine translation of JP 2008-264600 A, pp. 1-23.*

* cited by examiner

*Primary Examiner* — Tony G Soohoo
*Assistant Examiner* — David C Mellon
(74) *Attorney, Agent, or Firm* — Steven A. Nielsen; Allman & Nielsen, P.C.

(57) ABSTRACT

Magnetic treatment units are comprised of a body (21) having a central aperture, and having a pair of recesses (28) on opposite sides of the central aperture for inserting and retaining magnets (22) when covered by sleeve (23). The magnets (22) are flat magnets that have their poles on their flat sides, and are inserted into the recesses (28) such that the north pole of one magnet faces the south pole of the other magnet in the opposite recess. The invention also provides for a magnetic treatment assembly (10) for insertion into a pipe (11) or open channel comprising baffle plate (14) having a plurality of apertures (18) of which some have magnetic treatment units (15) attached to them such that the magnetic treatment units (15) are regularly spaced about baffle plate, and orientated so that north and south poles of magnets (22) in adjacent magnetic treatment units (15) are aligned.

12 Claims, 10 Drawing Sheets

MAGNETIC TREATMENT OF FLUIDS

TECHNICAL FIELD

This invention relates to the magnetic treatment of fluids such as water and fuels including petroleum products. For the sake of convenience, the invention will be initially described in relation to the magnetic treatment of large volumes of water and petroleum products.

BACKGROUND OF THE INVENTION

Almost all water from rivers, dams and lakes as well as municipal treated water is contaminated with particles and/or toxins. These particles and/or toxins attach themselves to the water molecules linking the molecules together to create much larger molecular clusters thereby affecting the physical properties of the water. Some of the effects on the water caused by the much larger molecular clusters include:
  (i) increased viscosity,
  (ii) reduced dissolvability,
  (iii) reduction in permeability of water in soil and also with respect to the permeability of water into the pores and capillaries of plants.

The magnetic treatment of water and fluids generally are known to cause certain physical and physiochemical changes to the water or fluid due to a restructure and reduction in size of the molecular clusters. In particular water that has been subjected to magnetic fields will exhibit certain properties including: reduced viscosity, increase in dissolvability, increased oxygen content, increased conductivity and increased permeability of treated water in respect of soil and plant capillaries and pores.

Commercial water treatment devices employing magnetic fields either by using permanent magnets or electromagnets have been disclosed in the art. However, such prior art systems have been unable to treat water flowing through large pipes which are commonly used in municipal water supply, power generation, irrigation including channels and pipes, and refineries in the petro-chemical industry.

Further, prior art systems have employed orientations of magnets which do not subject the fluid that is treated to the full effects of the magnetic field generated by the magnet. Indeed, in the prior art systems the wrong sorts of magnets have been utilised, thereby reducing the efficacy of the treatment, in particular by employing magnets of the sort that are easily degradable over time by heat and other physical factors.

It is an object of the invention to substantially ameliorate the deficiencies of the prior art, and to provide an apparatus for the effective magnetic treatment of fluids.

SUMMARY OF INVENTION

According to one aspect of the invention there is provided a magnetic treatment unit for magnetically treating fluids comprising:
  (i) a body having a fluid inlet, fluid outlet and a central aperture therebetween which defines a fluid treatment zone of the body, and a pair of opposed first and second recesses for receiving magnets; and
  (ii) a magnet within each recess wherein
    a. the north pole of a first magnet in the first recess is parallel to and faces the south pole of a second magnet in the second recess and wherein
    b. the faces of the first and second magnets are located at opposite sides of the fluid treatment zone of the body, and wherein the flow of the fluid through the fluid treatment zone is substantially perpendicular to, and through, the magnetic flux created by the first and second magnets.

In a preferred embodiment of the invention there is more than one magnet in each recess of the magnetic treatment unit.

In a further preferred embodiment of the invention the magnets are retained in the recesses of the body by placing a sleeve over the magnetic treatment unit.

In an alternate preferred embodiment of the invention, the magnets are formed into the body such that they are not removable or replaceable.

In a further preferred embodiment of the invention, the magnetic treatment unit has means for connecting a plurality of magnetic treatment units together in series.

In a still further preferred embodiment of the invention, the magnets utilised are flat magnets that feature north and south poles on opposite flat sides.

In preferred embodiment of the invention there is a plurality of pairs of recesses.

In another embodiment of the invention, there is provided a magnetic treatment assembly incorporating the magnetic treatment units for magnetically treating fluids comprising:
  (i) a baffle plate made of a non-ferromagnetic material having a plurality of apertures, and adapted to be retained in a pipe or open channel;
  (ii) a plurality of magnetic treatment units retained on at least some of the plurality of apertures of the baffle plate, and wherein the magnetic treatment units are orientated in a regular fashion, and wherein the outward facing poles of the magnets contained in adjacent magnetic treatment units are orientated in a way such that the north pole of one magnetic treatment unit is closely aligned with the south pole of the adjacent magnetic treatment unit so that magnetic flux is generated between the magnetic treatment units in an area where there may be an aperture in the baffle plate which does not have a magnetic treatment unit retained against it; and
wherein the fluid to be treated flows through the central apertures of the plurality of magnetic water treatment units for treatment in their fluid treatment zones or through an area in which there is magnetic flux as a result of the interactions between the north and south faces of adjacent magnetic treatment units.

In a preferred embodiment of the invention magnetic treatment units are located on the inlet side of the baffle plate and wherein the fluid to be treated flows either through the central aperture of the magnetic treatment units or around said units, before passing through the apertures of baffle plate.

In an alternate embodiment of the invention the magnetic treatment units are located on the outlet side of the baffle plate and wherein the fluid to be treated first flows though the apertures of the baffle plate into either a magnetic water treatment unit located on at least some of the apertures, or through the apertures in which no magnetic treatment unit is mounted.

In a preferred embodiment of the invention the magnetic treatment units may be joined in serial before being retained against some of the plurality of apertures of the magnetic treatment assembly.

In a still further preferred embodiment of the invention, magnetic treatment units may be retained on both sides of the baffle plate.

In a still preferred embodiment of the invention, there are 4 apertures in the baffle plate, three of which are for retaining and communicating fluid through magnetic treatment units attached thereto, and the fourth being a large irregular shaped aperture which communicates fluid around the magnetic treatment units.

In a further still preferred embodiment of the invention, there are 9 apertures in the baffle plate, 7 of which are for retaining and communicating fluid through magnetic treatment units attached thereto, and which are orientated such that there is one central magnetic treatment unit, and 6 peripheral magnetic treatment units spaced apart in a regular fashion around the central magnetic treatment unit, and the eighth and ninth apertures which are irregularly shaped and which communicates fluid to an area around the magnetic treatment units.

In a preferred embodiment of the invention, the central magnetic treatment unit is larger in size, and contains a stronger magnet to the surrounding magnetic treatment units.

In a still preferred embodiment of the invention the baffle plate can be of an irregular shape such that when inserted into a pipe or channel, the fluid to be treated can flow around the edges of the baffle plate in addition to through the plurality of apertures formed in the plate itself.

In a preferred embodiment of the invention, the baffle plate may be made in a star like shape where the magnetic treatment units are arranged along the apertures formed within the arm shaped portions of the star shaped baffle plate.

In an alternative preferred embodiment of the invention the magnetic treatment units are retained against all the plurality of apertures in the baffle plate.

It is preferred that each magnet has a range of magnetic induction ranging from 500 gauss to 12000 gauss or a combination thereof.

SUMMARY OF THE FIGURES

In order that the invention may be more readily understood and put into practical effect, reference will now be made to the accompanying drawings in which various embodiments of the present invention are depicted.

Figure 2:
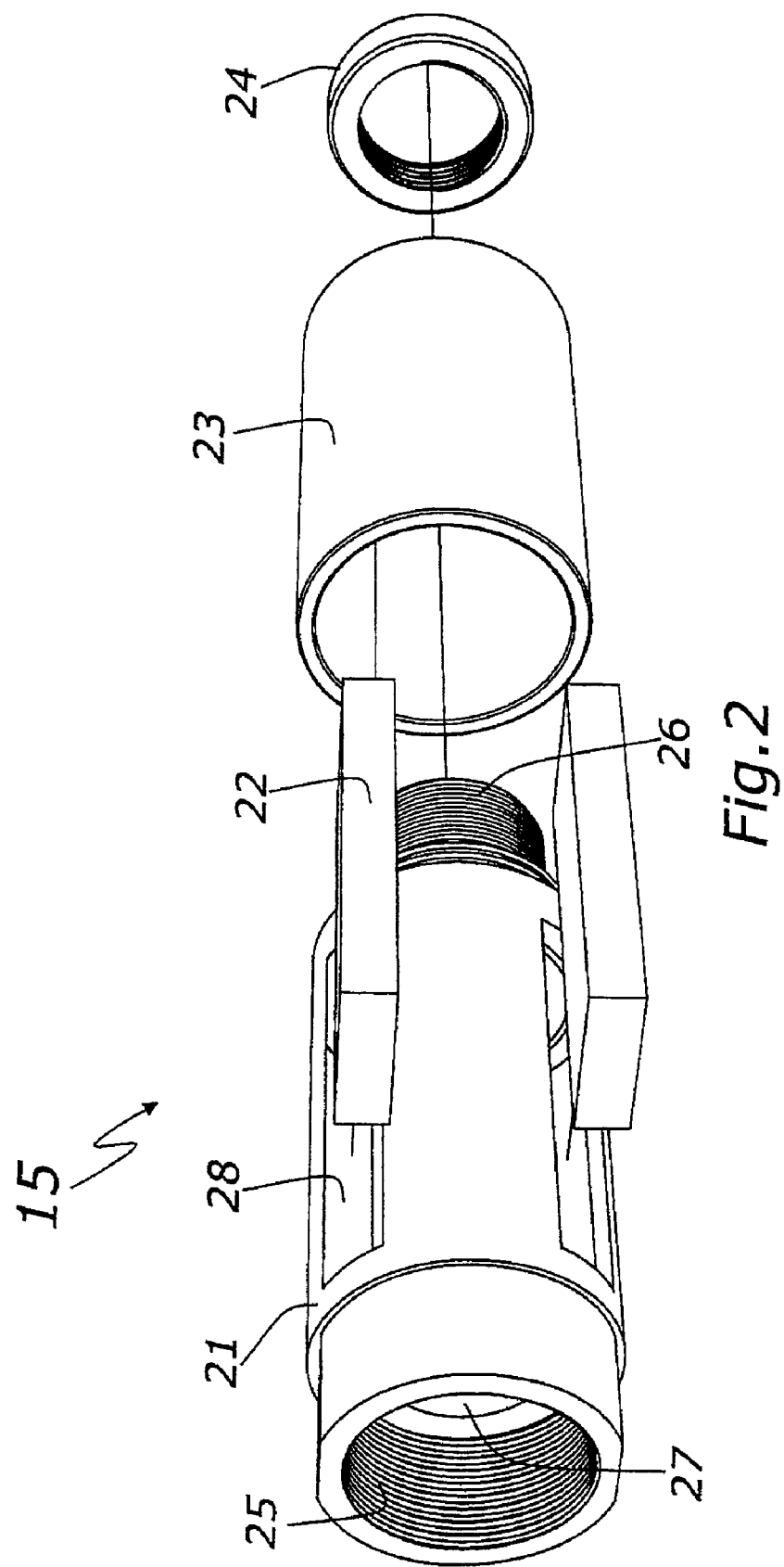
FIG. 2 is an exploded perspective view of a magnetic treatment unit.

| Reference Numbers | |
|---|---|
| 10 | magnetic treatment assembly |
| 11 | pipe |
| 12 | inlet end of flow pipe |
| 13 | outlet end of flow pipe |
| 14 | baffle plate |
| 15 | magnetic treatment unit, embodiment of FIG. 2 |
| 16 | bolts |
| 17 | void or aperture within outlet end 13 flow pipe used to accept bolt 16 of the inlet end 12 of a flow pipe |
| 18 | a remaining aperture, defined within a baffle plate and between the circular apertures attached to magnetic treatment units. Fluid entering through the remaining aperture 18 is treated while passing between magnetic treatment units. |
| 21 | cylindrical body |
| 22 | retaining magnets |
| 23 | sleeve |
| 24 | nut |
| 25 | outlet end of central aperture |
| 26 | inlet end of central aperture |
| 27 | central aperture |
| 28 | recesses of body 21 |
| 31 | outward face North Pole of magnet 32 |
| 32 | flat magnet shown in superior position in FIG. 3 |
| 33 | inward face North Pole of magnet 34 |
| 34 | flat magnet shown in inferior position in FIG. 3 |
| 35 | magnetic field |
| 36 | magnetic field |
| 37 | directional arrow for flow of water |
| 40 | double magnetic treatment unit shown in FIG. 4 |
| 50 | magnet |
| 51 | magnetic treatment unit shown in FIG. 5 |
| 52 | remaining aperture area between magnetic treatment units, fluid within the remaining aperture area 52 is treated by magnetic flux originating from adjacent magnetic treatment units 60 magnetic treatment unit shown in foreground of FIG. 6, with unit 60 being larger than the other magnetic treatment units |
| 61 | magnetic treatment unit shown in background of FIG. 6, |
| 70 | open channel |
| 71 | aperture within a magnetic treatment unit |
| 72 | remaining aperture between magnetic treatment units |
| 80 | baffle plate shown in FIG. 8 and FIG. 9. |
| 81 | opening within baffle plate 80 |
| 82 | circular apertures within baffle plate 80 |
| 83 | water passage ways within baffle plate 80 |
| 100 | star shaped baffle plate of FIG. 10 |
| 101 | aperture or void within baffle plate 100 |

DETAILED DESCRIPTION

The present invention provides a magnetic treatment unit and magnetic treatment assembly. The magnetic treatment assembly is itself comprised of a number of individual magnetic treatment units assembled together with the aid of a baffle plate for insertion into a pipe or into an open channel such as those used for irrigation.

Each magnetic water treatment unit possesses one or more pairs of magnets orientated such that the north pole of the first magnet is parallel to and facing the south pole of the second magnet of each pair of magnets. In order to achieve maximum efficiency, rather than use conventional bar magnets, it was discovered that by using flat magnets where the poles are on the opposite flat sides of the magnet, the strength of the magnetic field across the treatment zone of the magnetic treatment unit can be maximised for the given size of the unit. Despite the preference for using flat magnets, conventional bar magnets can be utilised, however in that case, the actual length of the bar magnets would need to be short, and multiple bar magnets aligned so all of their poles face the surface of the treatment zone of the magnetic treatment units.

Further, when flat magnets are utilised, they are further modified by grinding regularly at least two grooves on each surface of the magnets. The grooves being 1.5 mm deep and 1 mm wide on a magnet of dimensions 60 mm×20 mm×4 mm. Further the two grooves are made along the length of the flat surfaces such that they causes localised disruptions in the fields emanating from the magnets. These local distortions, together with the variations in the earths magnetic field, operate to create a shifting meridian having the effect of creating more turbulence in the magnetic flux which has an effect on the water treated.

By orientating the magnetic treatment units in a particular orientation, there is a synergistic effect that operates to increase the effectiveness of the magnetic treatment of fluids. Partly this is due the interactions that occur between the earth's magnetic field and the fields of the pairs of magnets contained within each magnetic treatment unit.

Figure 1:
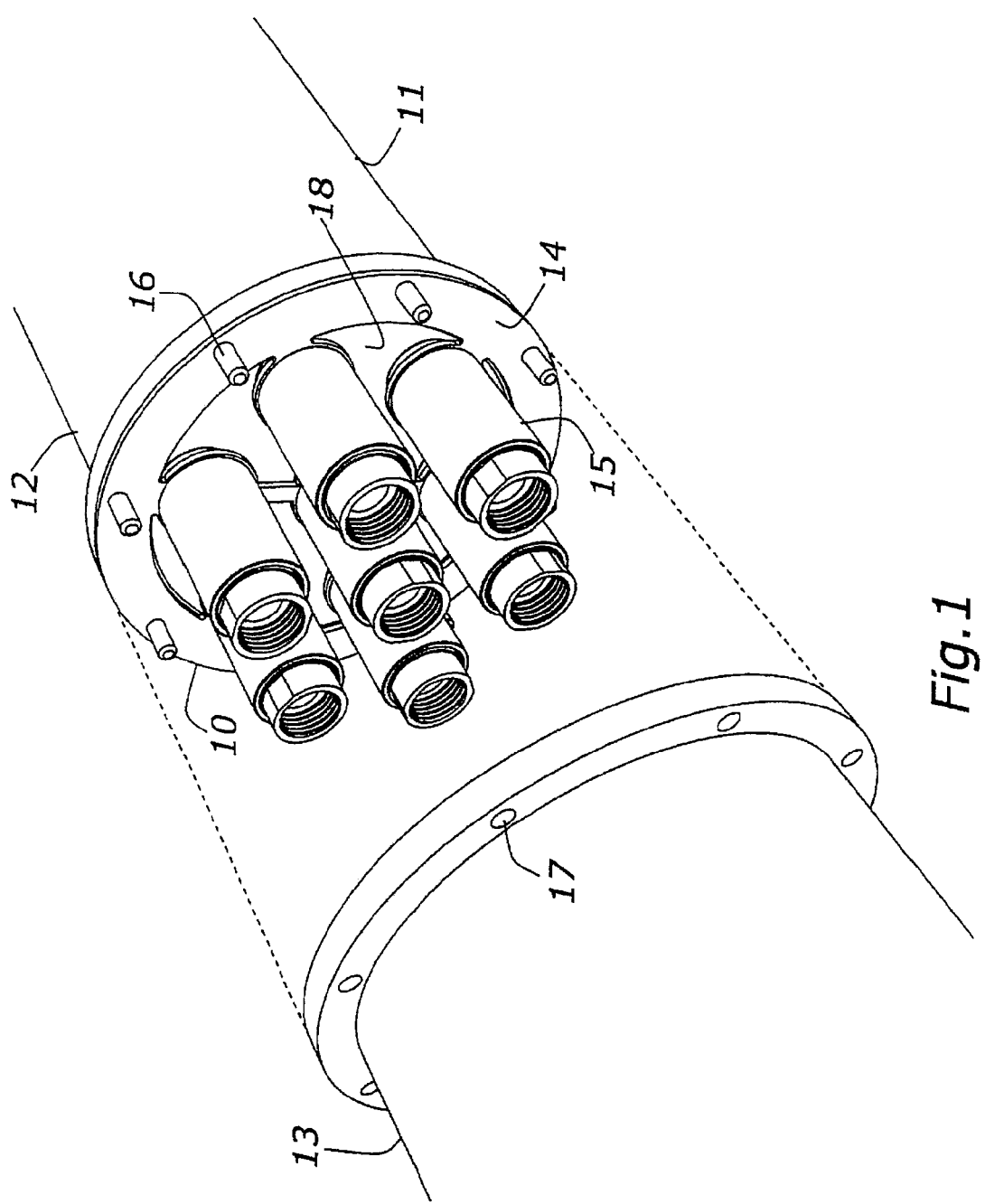
FIG. 1 is an exploded perspective view of a magnetic treatment assembly.

The magnetic water treatment assembly 10 shown in FIG. 1 incorporates a flow pipe 11 having an inlet end 12 and an outlet end 13. Adjacent the inlet end 12 there is a baffle plate 14 which carries a plurality of magnetic treatment units 15 spaced around the baffle plate in a regularly spaced apart manner. Magnetic treatment units partially penetrate apertures (not shown) in the baffle plate 14 whereby they are secured to the baffle plate at the rear through the use of either a nut (not shown) or another magnetic treatment unit (not shown).

Baffle plate 14 also features apertures 18 which are voids in the structures of the baffle plate such that water to be treated can flow through and around magnetic treatment units 15. FIG. 1 also depicts bolts 16 which correspond with apertures 17 such that the inlet pipe 12 and outlet pipe 13 can be connected together through the use of nuts (not shown).

FIG. 2 depicts the magnetic treatment units 15 of FIG. 1 in an exploded state. Each magnetic treatment unit 15 is comprised of a substantially cylindrical body 21 having a central aperture 27 which communicates fluid between its inlet end 22 to its outlet end 25. Both inlet end 22 and outlet end 25 feature male and female complementary threading for attaching further magnetic treatment units in serial, or alternatively, for attachment to a baffle plate 14 (not shown) through the use of nut 24. The body 21 also has two recesses 28 in which flat magnets 22 are slid into before sleeve 23 is put into place over the body 21. In alternate embodiments there may be more than one set of recesses. Indeed, it is possible to have two pairs of recesses for taking two pairs of magnets and which are spaced at 90 degree intervals around the circumference of the body of the water treatment units.

Figure 3:
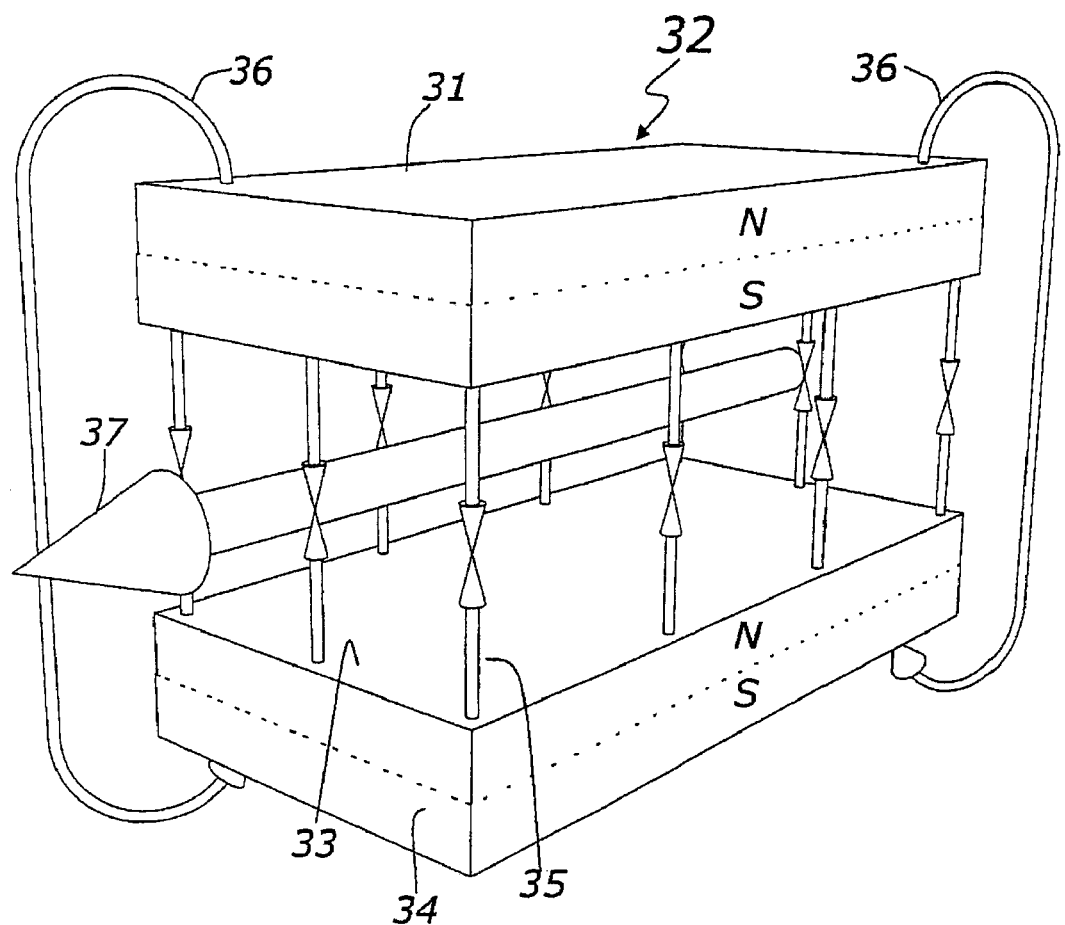
FIG. 3 is a simplified perspective view of the magnets of a magnetic treatment unit and the magnetic fields generated by them in relation to the flow of fluid.

FIG. 3 depicts a simplified schematic of the orientation of the poles of the magnets, the magnetic fields generated, and the flow of the water. Magnets 32 and 34 are flat magnets, meaning that each face of the flat side of each magnet comprises a pole of the magnet. Thus the outward facing face 31 of the magnet 32 is in fact an outward facing north pole. Similarly the inwardly facing face 33 is the North pole of magnet 24. The depicted orientation of the magnets is maintained when housed in the recesses of the body of the magnetic treatment unit as depicted in FIG. 2. This generates a particularly strong magnetic field 35 between the two magnets. The magnetic field also extends out from the outward faces of the magnets as depicted by fields 36, and 38. The water or fluid to be treated flows within the central aperture of the water treatment unit as indicated by the arrow 37 which shows that the flow is substantially perpendicular to the lines of magnetic flux.

Figure 4:
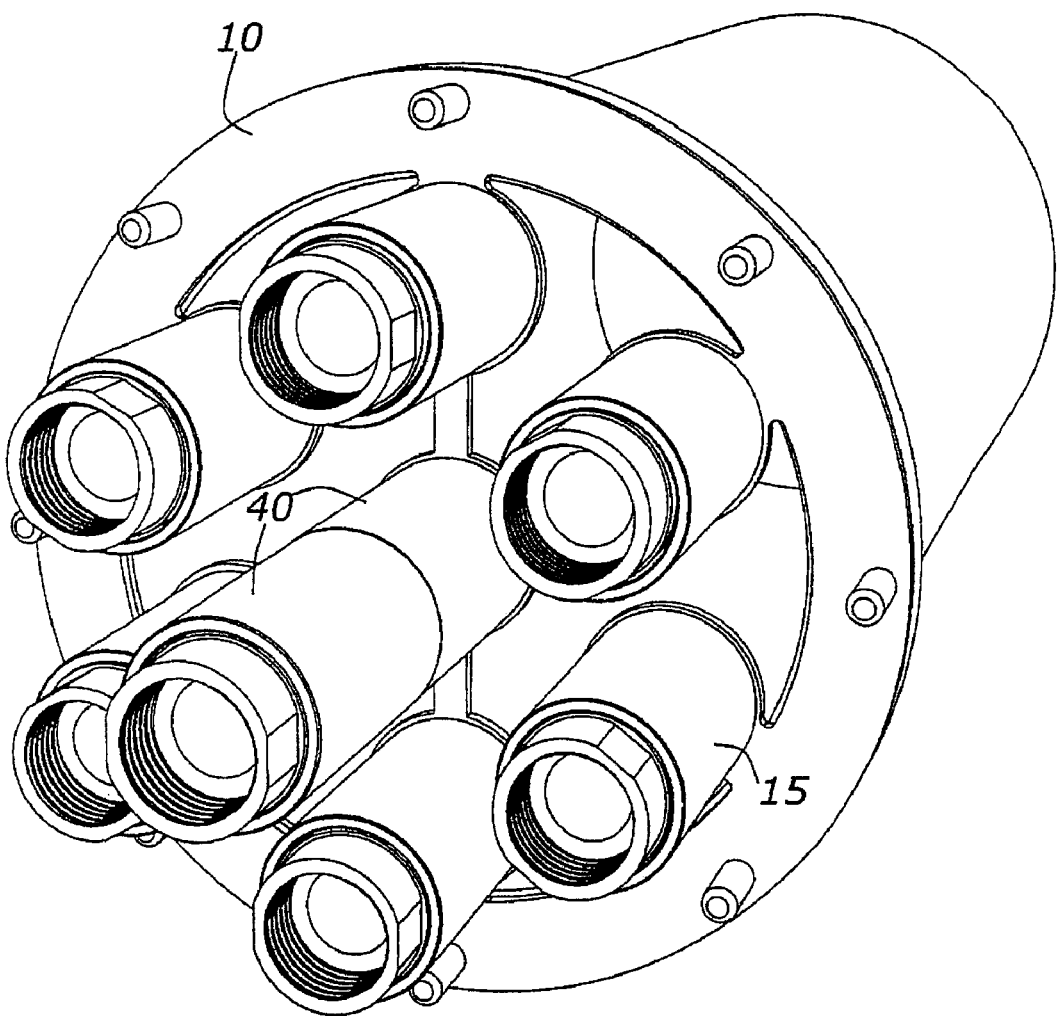
FIG. 4 is a perspective view of a magnetic treatment assembly in which two magnetic treatments units are joined to form a double magnetic treatment unit.

FIG. 4 depicts an alternate embodiment of the invention in which two magnetic treatment units 15 are joined in series to form a double magnetic treatment unit 40. In this case the fluid treatment zone formed between the magnets of the magnetic treatment units is made twice as long and therefore the fluid being treated can be subjected to twice the amount of magnetism as compared with the fluid flowing through single magnetic treatment unit 15.

Figure 5:
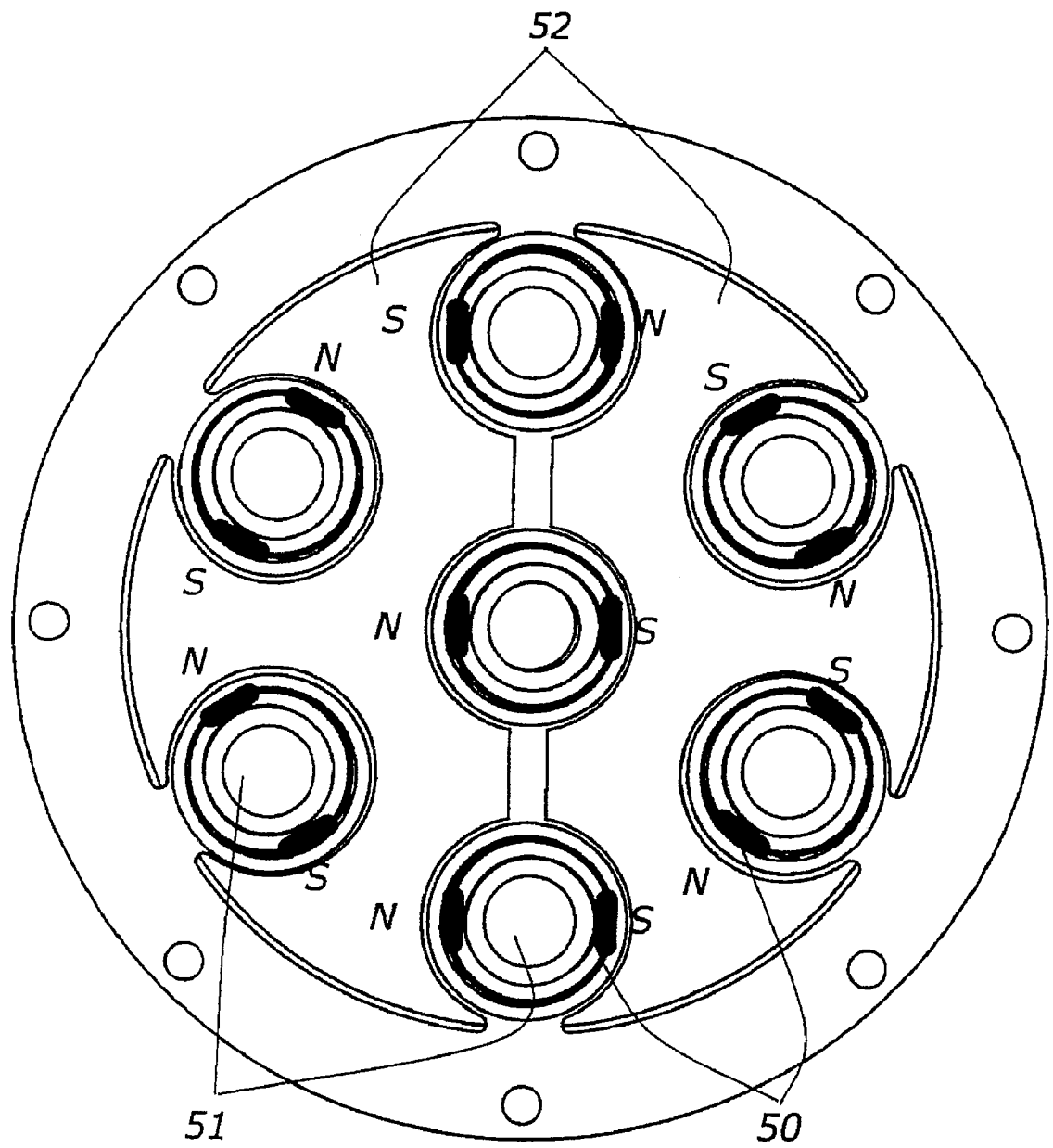
FIG. 5 is a plan view of the orientation of the magnets inside the magnetic treatment units as they are attached to the baffle plate of the magnetic treatment assembly.

FIG. 5 depicts the orientation of the magnets 50 contained within the magnetic treatment units 51. As can be seen, to the extent possible, the outward facing poles of the magnets 50 are orientated such that North is adjacent to South. This arrangement of magnets 50 ensures that there is significant magnetic field or lines of magnetic flux in the areas 52 between magnetic treatment units 51 through which water and fluids to be treated can flow. The central magnetic treatment unit need not be orientated in any particular direction with respect to the poles of its incorporated magnets. Rather, the magnets in the central magnetic treatment unit needs to be stronger in magnetic induction than the ones employed in the peripheral magnetic treatment units.

Figure 6:
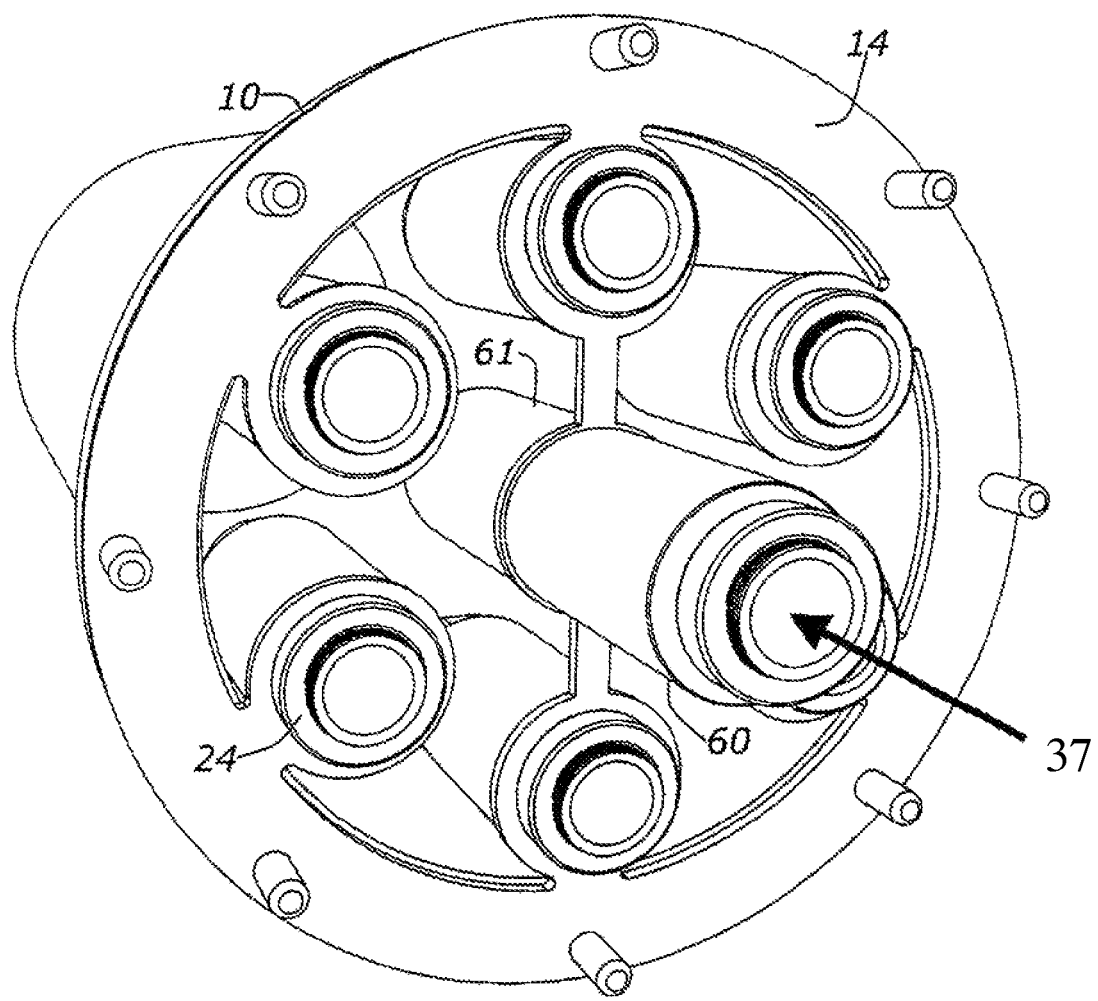
FIG. 6 is a perspective view of a magnetic treatment assembly in which there are magnetic treatment units attached to both sides of its baffle plate.

FIG. 6 shows a magnetic treatment assembly from the inlet side. As can be seen in this figure, the baffle plate 14 of the magnetic treatment assembly 10 has magnetic treatment units attached to both sides of the baffle plate as shown by the magnetic treatment unit 60 which extends into the inlet side of the assembly, and the magnetic treatment unit 61 which extends into the outlet side of the assembly. In the present example, where two magnetic treatment units are connected to the baffle plate 14 on either side, there is no need for nut 24 which is used to otherwise secure single magnetic treatment units to the baffle plate 14.

In an alternate embodiment to the invention, it is equally possible, indeed, sometimes preferable, for the magnetic treatment units to be located on the inlet side of the water treatment assembly. In this way, should anything happen to one or more of the magnetic treatment units and they fall off or break up, those units would remain in place against the baffle plate due to the flow of the water. This means that the units would not flow down the outlet side of the assembly and get stick or otherwise obstruct or damage the infrastructure. Further, any breakdowns can be fixed in the one position as again they units would be immobilised by the baffle plate.

Figure 7:
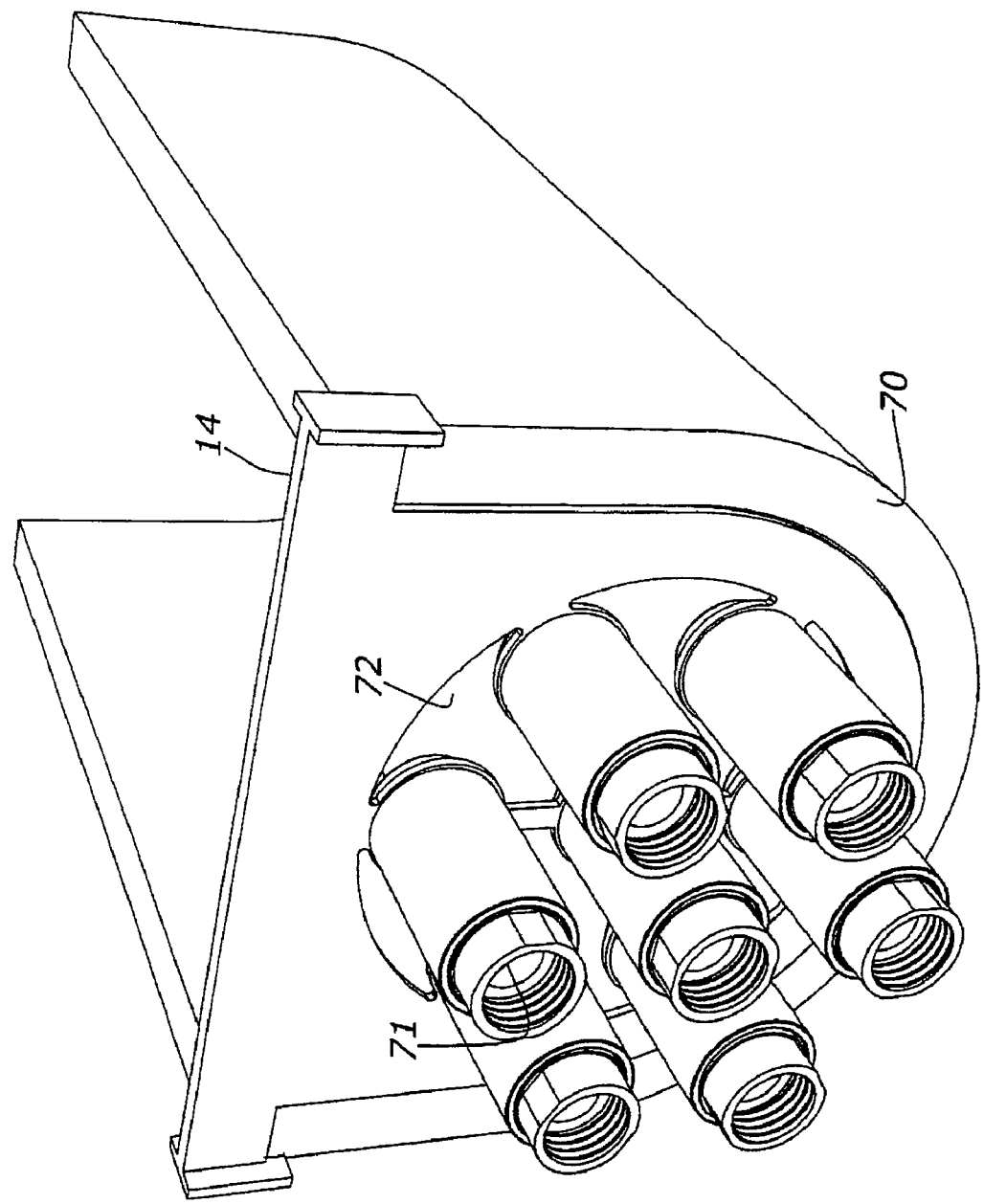
FIG. 7 is a perspective view of a magnetic treatment assembly situated in an open channel.

FIG. 7 depicts a water treatment assembly situated in open channel (only one half of the channel is shown). In particular, baffle plate 14 is shown at a junction of the open channel, 70. Water flows from channel 70 and through apertures 71 and 72 to the outlet side of the assembly (not shown).

Figure 8:
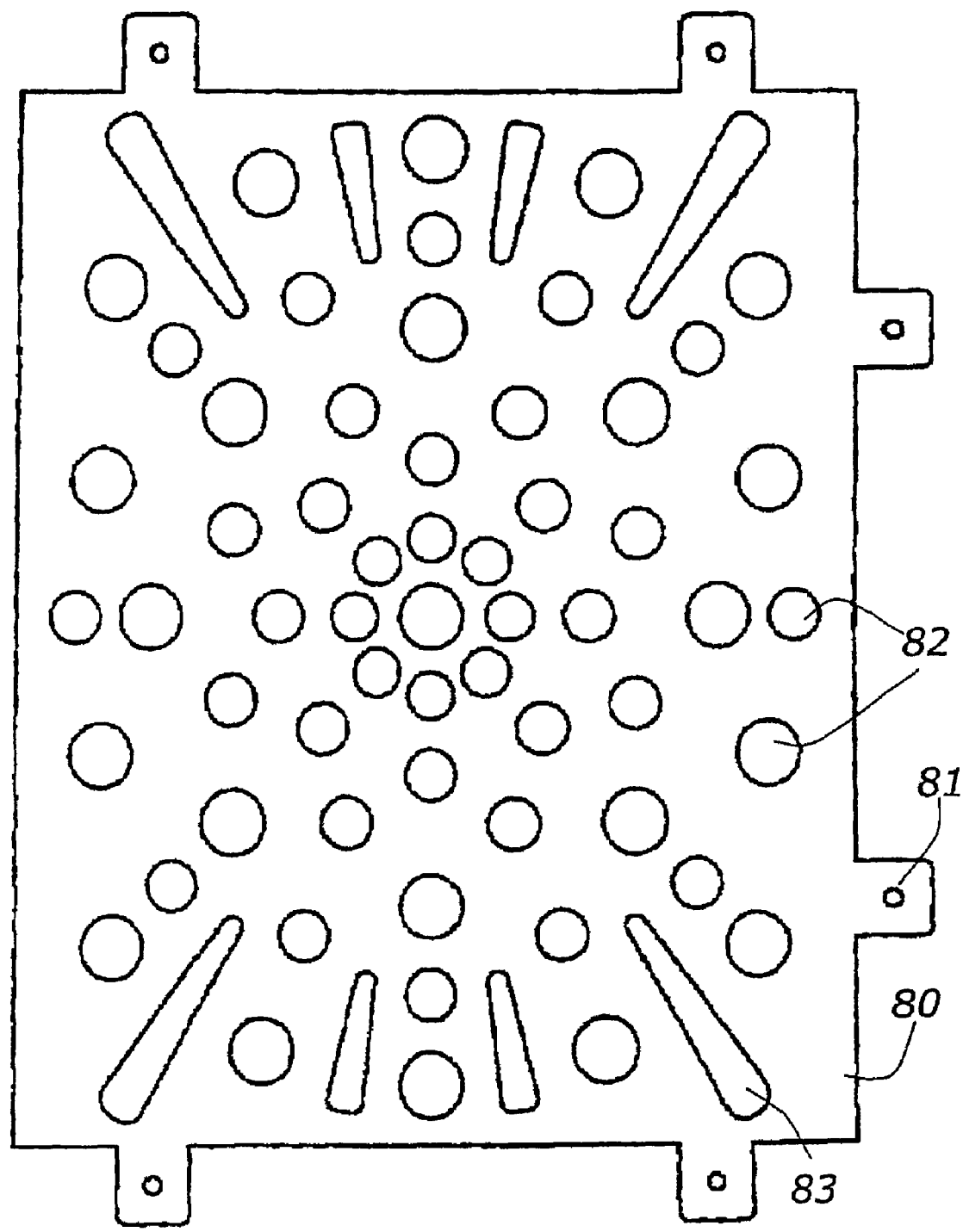
FIG. 8 is a plan view of a baffle plate according to one aspect of the invention.
Figure 9:
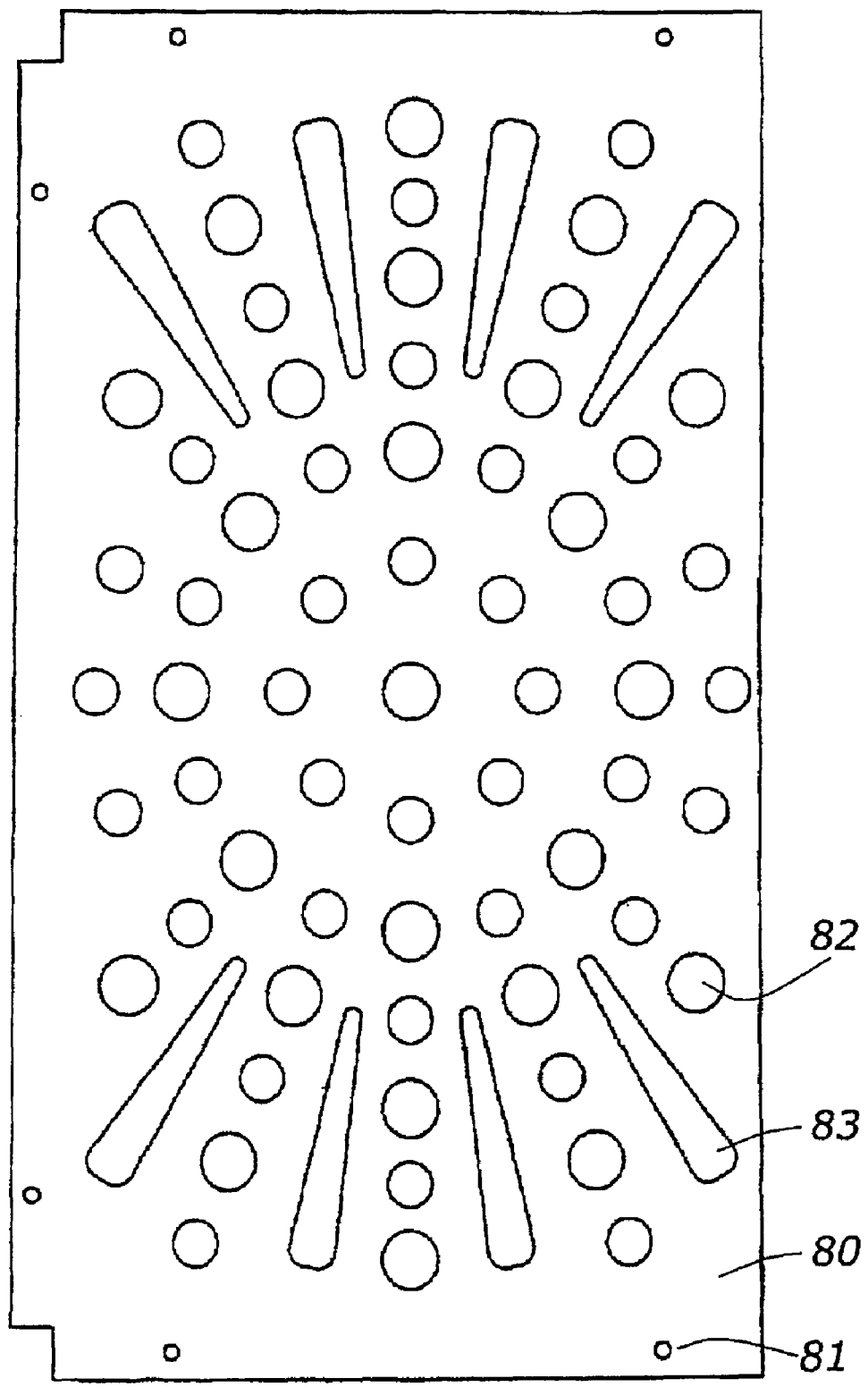
FIG. 9 is a plan view of a baffle plate according to a further aspect of the invention.
Figure 10:
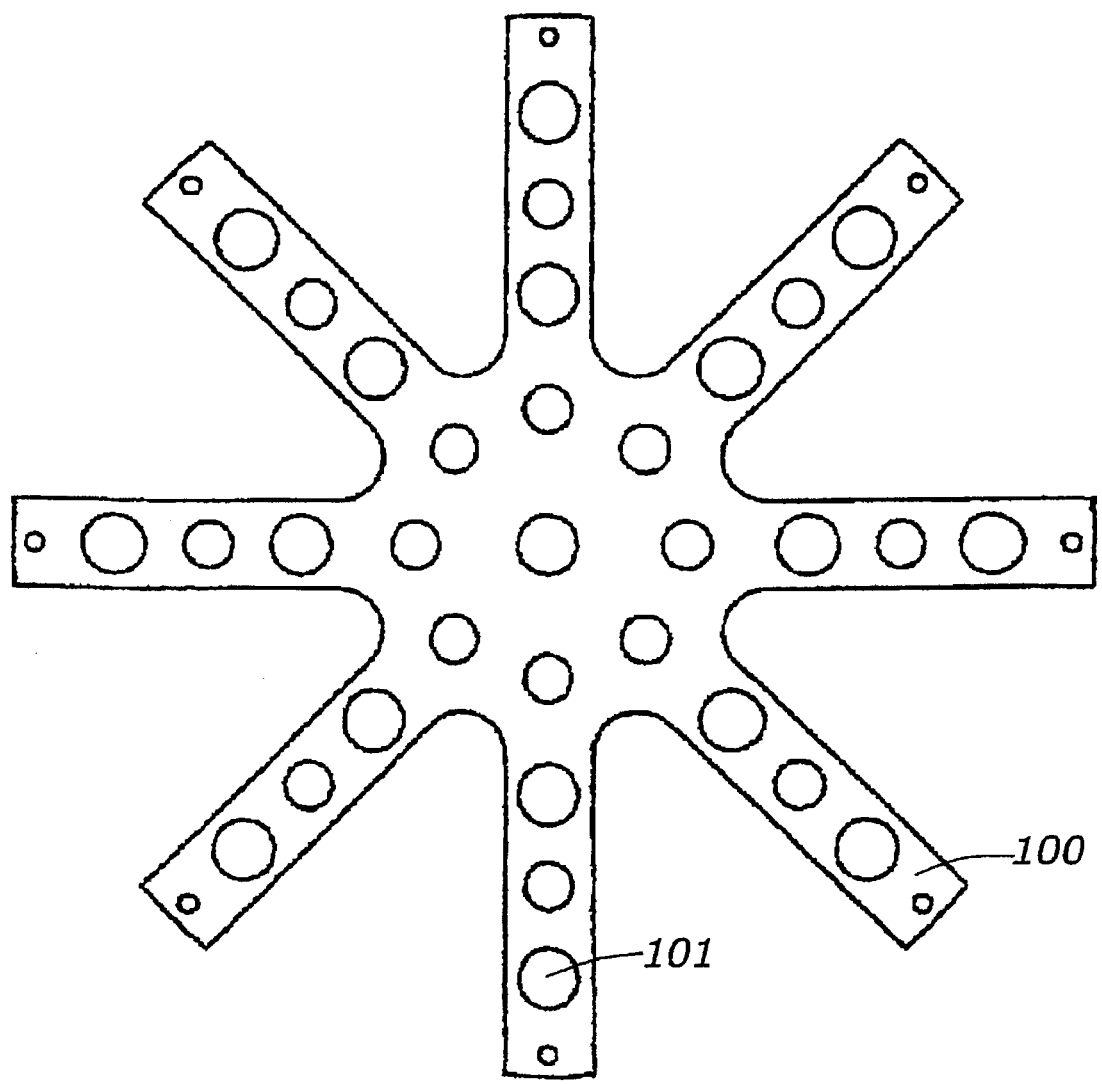
FIG. 10 is a plan view of a baffle plate according to a still further aspect of the invention.

FIGS. 8, 9 and 10 all show alternative baffle plates with differing number and positioning of the plurality of apertures. FIG. 8

The baffle plates 80 shown in FIGS. 8 and 9 are substantially similar to that shown in FIG. 1. The baffle plates 80 are mounted in a pipe or channel by rivets or bolts which pass through their openings 81. The baffle plate in addition to circular apertures 82 which may or may not have water treatment units attached, feature elongate water passageways 83 to facilitate the flow of water through the baffle plate 80.

The baffle plate 100 shown in FIG. 10 is of an irregular shape whereupon water that is to be treated can flow around the edges of the baffle plate 100, in addition to through the apertures 101 where magnetic treatment units are attached.

The magnets used in the invention may be of any convenient kind such as:
(i) neodymium-iron-boron (Nd—Fe—B),
(ii) samarium-cobalt (Sm—Co),
(iii) alnico,
(iv) hard ferrite (ceramic), and
(v) bonded Nd—Fe—B magnets.

Sintered neodymium-iron-boron permanent magnets are preferred for the magnetic treatment of large volumes of water. Although the maximum application temperature is preferably around 200° C. for high coercivity grades of magnets, rare earth samarium cobalt magnetic materials may be used for temperatures up to 350° C.

Coated neodymium-iron-boron magnets may be exposed to humidity, chemically aggressive media such as acids, alkaline solutions, salts and harmful gases.

The magnets utilised in the magnetic treatment units need to have the following properties:

| | |
|---|---|
| Typical Magnetic Induction Range | 500 Gausses to 12,000 Gausses |
| Curie Temperature | 120° C.-380° C. |
| Coefficient of Thermal Expansion - Perpendicular | $-1.0 - -3 \times 10^{-6}$ C.$^{-1}$ |
| Coefficient of Thermal Expansion - Parallel | $+5.0 - +8.0 \times 10^{-6}$ C.$^{-1}$ |
| Electrical Resistivity | 120-160 $\mu\Omega$-cm |
| Density | 7.4-7.8 g·cm$^{-3}$ |
| Vicker's Hardness | 550-650 H$_v$ |
| Young's Modulus | 150-170 kN-mm$^{-2}$ |
| Bending Strength | 0.18-0.29 kN-mm$^{-2}$ |
| Compressive Strength | 0.8-1.0 kN-mm$^{-2}$ |

For smaller scale operations, including irrigating small to medium landholdings, Table 1 provides the diameters of the pipe (or channel for the larger diameters) containing a magnetic treatment assembly that will need to be used to treat the irrigation water.

TABLE 1

| Diameter of Pipe | Output of a device |
|---|---|
| 8 mm | 1.5 m$^3$/hr |
| 12.5 mm | 8 m$^3$/hr |
| 25 mm | 40 m$^3$/hr |
| 50 mm | 96 m$^3$/hr |
| 100 mm | 210 m$^3$/hr |
| 1000 mm | 2600 m3/hr |
| 1500 mm | 3900 m/3 hr |
| 2000 mm | 5800 m//3 hr |

For pipe sizes up to four inches, single magnetic treatment units of various sizes can be used by attaching the pipe to either end of the magnetic treatment unit and running the fluid to be treated through it. In these instances, the internal diameter of the central aperture of the magnetic treatment unit should match the size of the pipe and the strength of the magnets utilised therein increased to maintain a consistent magnetic induction through the treatment zone.

For larger pipe sizes, and for open channels, magnetic treatment assemblies will be required to be employed. Once the size of the pipe is determined, and the level of contamination or salinity of the water known, the next step would be to determine the configuration of the magnetic treatment units that would be required to treat the water. The way this is done, is exactly the same way you would determine the configuration of magnetic water treatment units required for use in very large pipes, or indeed, very large open channels. These large scale applications would encompass treating vast quantities of water including whole rivers, lakes and even sea lagoons.

The principle considerations in determining what an effective configuration would be for each particular application include the strength of the magnet, and the distance between magnetic treatment units of the magnetic treatment assembly. The aim of the invention is to provide sufficient magnetic treatment units, incorporating magnets of sufficient strength, and in an orientation that reinforces the magnetic properties of the magnets, such that there exists at all points, and in particular, in between magnetic treatment units, sufficient magnetic induction such that the fluid being treated is effectively treated.

In the specific embodiment provided in FIG. 1, where there are 7 magnetic treatment units on a baffle plate for use in an 8 inch pipe, the maximum distance between any two magnetic treatment units is 75 mm (measured from centre of the apertures against which the magnetic treatment units are retained). This particular configuration suitable for use with magnets of 4,000 gauss. In cases where there are relatively high levels of total dissolved solids (3000 ppm or above) the strength of the magnets utilised in the magnetic treatment units should be increased to 6,000 gauss. In extreme situations where the total dissolved solids is very high, (7,000 ppm or more) magnets of 6,000 or more are used to effectively treat the water or fluid.

If the shape of the baffle plate retaining the magnetic treatment units is unable to maintain equal spacing between the units, then in order to compensate for the sometimes greater distances between the apertures of the baffle plate, such as those depicted in FIG. 10 where the units of the assembled magnetic treatment assembly on the outer edge of the arm would be spaced apart further then those closer to the centre of the star shaped baffle plate. In those circumstances, you would employ magnets of a much higher strength to compensate for the increased distance. For example, in the embodiment depicted in FIG. 10 where the outside diameter of the baffle plate is 550 mm, the outer magnetic treatment units would employ magnets of 8,000 gauss as the distance between those units would be approximately 150 mm, where those in the central portion of the assembly would only need to employ magnets of 2,000 gauss, with the intermediate magnetic treatment units employing magnets of around 4,000 gauss.

The treated water exhibits the following characteristics
(a) increased permeability keeping plants and soil hydrated reducing the need for water usage,
(b) reduced viscosity allowing the water to travel free through pipes and irrigation pipes and canals saving energy in irrigation pipes and generators,
(c) increase in dissolvability which reduces the need for fertiliser/chemical usage and it also prevents or reduces scaling in irrigation pipes, jets,
(d) increased oxygen content and conductivity,
(e) an increase in dissolvability, permeability allows for saline water containing 5000 parts per million of total dissolved solids/salts (5000 ppm TDS) to be used for irrigation of crops,
(f) increased dissolvability and permeability and reduction in viscosity also results in magnetic treated water to be used for soil desalinisation due to its ability to wash away salt build up from soils pores and prevent incrustation/scaling in soils;
(g) reduced temperature of vaporisation and reduced heat capacity resulting in increased efficiencies when the treated water is used in boilers and power generation;
(h) with respect to vegetative matter and produce grown using water that has been treated, there are also a number of different effects including: increased yield, increased mineral and nutrient content, increased water productivity, reduced transpiration from plants, and reduced fertiliser and chemical usage.

Various modifications may be made in details of design and construction without departing from the scope and ambit of the invention.

What is claimed is:

1. A system for magnetically treating fluid, the system comprising:
   a) a plurality of magnetic treatment units, each magnetic treatment unit comprising:
      i. a body having a fluid inlet, a fluid outlet and a central aperture there between which defines a fluid treatment zone of the body, and a pair of opposed first and second recesses for receiving magnets; and
      ii. a magnet within each recess wherein
         a) the north pole of a first magnet in the first recess is parallel to and faces the south pole of a second magnet in the second recess and wherein
         b) the faces of the first and second magnets are located at opposite sides of the fluid treatment zone of the body,
   and wherein fluid flowing through the fluid treatment zone is substantially perpendicular to, and through, the magnetic flux created by the first and second magnets
   and wherein the magnets are retained in the recesses of the body by use of a sleeve over the magnets, and wherein magnetic flux reaches fluid flowing between the magnetic treatment units;
   b) a baffle plate made of a non-ferromagnetic material, the baffle plate adapted to be retained in a pipe, the baffle plate having a plurality of circular apertures for attachment to the magnetic treatment units and the baffle plate having one or more remaining apertures allowing fluid to pass between the magnetic treatment units;
   wherein the plurality of magnetic treatment units are retained on at least some of the plurality of circular apertures of the baffle plate, and wherein the outward facing poles of the magnets contained in adjacent magnetic treatment units are orientated in a way such that the north pole of one magnetic treatment unit is closely aligned with the south pole of the adjacent magnetic treatment unit so that magnetic flux is generated between the magnetic treatment units; and
   wherein the fluid to be treated flows through:
      (i) the central apertures of the plurality of magnetic water treatment units for treatment in their fluid treatment zones and
      (ii) through one or more areas in which there is magnetic flux as a result of the interactions between the north and south faces of adjacent magnetic treatment units.

2. A magnetic treatment assembly of claim 1 wherein the magnetic treatment units are located on an inlet side of the baffle plate and wherein the fluid to be treated flows either through the central aperture of the magnetic treatment units or around said units, before passing through the apertures of the baffle plate.

3. A magnetic treatment assembly of claim 1 wherein the magnetic treatment units are located on an outlet side of the baffle plate and wherein the fluid to be treated first flows though the apertures of the baffle plate into either a magnetic treatment unit located on at least some of the circular apertures, or through a remaining aperture in which no magnetic treatment unit is mounted.

4. The magnetic treatment assembly of claim 1 wherein the magnetic treatment units are joined in serial before being retained against some of the plurality of apertures of the magnetic treatment assembly.

5. The magnetic treatment assembly of claim 1 wherein the magnetic treatment units are retained on both sides of the baffle plate.

6. The magnetic treatment assembly of claim 1 wherein there are seven apertures in the baffle plate, six of which are for retaining and communicating fluid through magnetic treatment units attached thereto, and the seventh aperture communicates fluid around the magnetic treatment units.

7. The magnetic treatment assembly of claim 1 having nine apertures in the baffle plate, seven of which are for retaining and communicating fluid through magnetic treatment units attached thereto, and which are orientated such that there is one central magnetic treatment unit, and six peripheral magnetic treatment units located around the central magnetic treatment unit, and the eighth and ninth remaining apertures communicate fluid to areas around the magnetic treatment units.

8. The magnetic treatment assembly of claim 1 wherein the central magnetic treatment unit is larger in size, and contains a stronger magnet as compared to the peripheral magnetic treatment units.

9. The magnetic treatment assembly of claim 1 wherein the baffle plate is of a non-circular shape such that when inserted into a pipe or channel, the fluid to be treated can flow around the edges of the baffle plate in addition to flowing through the plurality of apertures formed in the baffle plate itself.

10. The magnetic treatment assembly of claim 1 wherein the baffle plate is star shaped and where the magnetic treatment units are arranged along the apertures formed within the arm shaped portions of the starshaped baffle plate.

11. The magnetic treatment assembly of claim 1 wherein the magnetic treatment units are retained against all the plurality of circular apertures in the baffle plate.

12. The magnetic treatment unit of claim 1 wherein each magnet employed exhibits a magnetic field in the range of 500 gauss to 12000 gauss.

* * * * *